(12) United States Patent
Takuma et al.

(10) Patent No.: US 6,482,916 B1
(45) Date of Patent: Nov. 19, 2002

(54) DYED MOLDED ARTICLE

(75) Inventors: Keisuke Takuma, Kanagawa (JP);
Atsuo Otsuji, Kanagawa (JP); Kenichi Fujii, Kanagawa (JP); Kenichi Sugimoto, Kanagawa (JP); Masao Imai, Kanagawa (JP); Rihiko Suzuki, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/856,701

(22) PCT Filed: Nov. 26, 1999

(86) PCT No.: PCT/JP99/06599

§ 371 (c)(1),
(2), (4) Date: May 25, 2001

(87) PCT Pub. No.: WO00/31168

PCT Pub. Date: Jun. 2, 2000

(30) Foreign Application Priority Data

Nov. 26, 1998 (JP) ............................................. 10-336251

(51) Int. Cl.[7] ............................................. C08G 64/00
(52) U.S. Cl. .................. 528/196; 264/176.1; 385/129; 385/130; 428/412; 430/270; 528/198
(58) Field of Search .......................... 428/412; 528/196, 528/198; 430/270; 264/176.1; 385/130, 129

(56) References Cited

U.S. PATENT DOCUMENTS 3,879,348 A 4/1975 Serini et al.

FOREIGN PATENT DOCUMENTS

| JP | 63-124001 | 5/1988 |
|----|-----------|--------|
| JP | 63-223034 | 9/1988 |
| JP | 7-325205 | 12/1995 |
| JP | 8-34848 | 2/1996 |
| JP | 8-81549 | 3/1996 |
| JP | 9-183835 | 7/1997 |

*Primary Examiner*—Terressa M. Boykin
(74) *Attorney, Agent, or Firm*—Burns, Doane, Swecker & Mathis, LLP

(57) ABSTRACT

The present invention provides a dyed molded article obtained by dyeing a polycarbonate molded article having repeating structural units represented by the following formula (1-a):

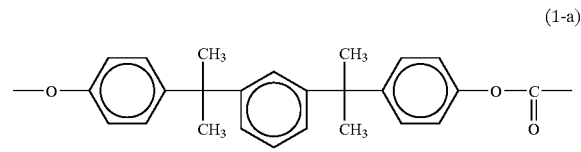

(1-a)

Since the polycarbonate molded article is dyed easily, the present invention has made it possible to provide a lens made of a dyed polycarbonate.

12 Claims, No Drawings

DYED MOLDED ARTICLE

TECHNICAL FIELD

The present invention relates to a dyed molded article comprising a polycarbonate having particular repeating structural units.

BACKGROUND ART

Transparent resins, as compared with inorganic glasses, have advantages, for example, in that they are light, hardly broken and superior in processability; therefore, they are used in optical applications such as various lenses (e.g. eyeglass lens) and the like, as substitutes for inorganic glasses.

As such resins used in optical applications, many kinds have been known heretofore. For example, thermosetting resins using diethylene glycol bis(allyl carbonate) as a monomer, i.e. DAC resins are used in a large amount in general-purpose eyeglass lenses because they are superior in transparency and heat resistance, small in color aberration and easy to dye. These DAC resins, however, have had drawbacks in that they are low in refractive index ($n_d$=1.50) and inferior in impact resistance.

Polycarbonates of 2,2-bis(4'-hydroxyphenyl)propane (so-called bisphenol A) (the polycarbonates are hereinafter referred to as BPA-PC), which are thermoplastic resins, are superior in transparency, impact resistance and heat resistance and have a relatively high refractive index; therefore, are in wide use as a resin for injection molded eyeglass lens. Polycarbonates typified by BPA-PC, however, are extremely difficult to dye by ordinary dyeing methods (e.g. dyeing with a disperse dye) and, in order to enable their dyeing, it has been necessary to form, on a lens to be dyed, a coat layer with a hard coat material which can be dyed, and then dye the coat layer (this has required complicated steps).

For dyeing a polycarbonate relatively easily, a method was proposed which comprises immersing a polycarbonate molded article to be dyed, in a solvent compound containing a dye, to dye the polycarbonate molded article directly (e.g. JP-A-8-104759). This method, however, can be viewed as a method of eroding the surface of a molded article (e.g. a lens) using an organic solvent and simultaneously dyeing the molded article with a dye or a pigment, and has been said to have an environmental problem in that the method uses an organic solvent. Moreover, the lens dyed by the above method is excessively eroded by the solvent compound at the surface, depending upon the dyeing conditions employed, and has reduced transparency; therefore, the dyed lens has no practical value.

In applications of transparent resin molded articles, for example, eyeglass lenses wherein fashionability is needed, there have been required not only optical properties (e.g. transparency and high refractive index), impact resistance, etc., but also being easily dyeable by a simple method. It is currently desired to develop a resin for optical application which is dyeable by a simple method, and a molded article obtained by dyeing such a resin.

The task of the present invention is to alleviate the above-mentioned problems and provide a dyed lens made of a polycarbonate having particular repeating structural units and high dyeability.

DISCLOSURE OF THE INVENTION

The present inventors made a study in order to solve the above-mentioned problems. As a result, the present inventors found out an easily dyeable aromatic polycarbonate. The finding has led to the completion of the present invention.

The present invention relates to the following.

(1) A dyed molded article obtained by dyeing a polycarbonate molded article having repeating structural units represented by the following formula (1-a):

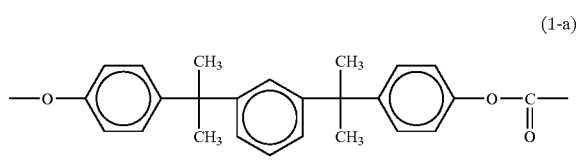

(1-a)

(2) A dyed molded article according to the above (1), obtained by dyeing the molded article with a disperse dye in an aqueous medium.

(3) A dyed molded article according to the above (1) or (2), having a spectral transmittance of 10 to 90% relative to the spectral transmittance of the molded article at one or more wavelengths selected from 430 nm, 510 nm and 595 nm.

(4) A dyed molded article according to any of the above (1) to (3), wherein the molded article comprises a polycarbonate having a weight-average molecular weight of 10,000 to 300,000.

(5) An optical lens made of a dyed molded article set forth in any of the above (1) to (4).

(6) An optical lens according to the above (5), wherein the portion of the dyed molded article having a thickness of 1.5±0.5 mm shows a spectral transmittance of 5 to 85% at one or more wavelengths selected from 430 nm, 510 nm and 595 nm.

BEST MODE FOR CARRYING OUT THE INVENTION

The present invention is described in detail below.

The present invention relates to a dyed molded article made of a polycarbonate having structural units represented by the above-shown formula (1-a).

The polycarbonate according to the present invention is obtained by reacting α,α'-bis(4-hydroxyphenyl)-1,3-diisopropylbenzene (hereinafter abbreviated to BPM or bisphenol M) represented by the following formula (1):

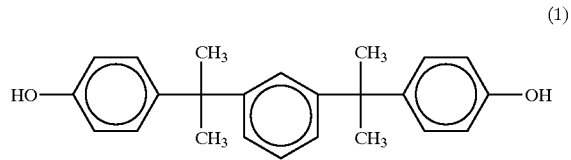

(1)

with a carbonate precursor (for example, a carbonic acid diester compound such as dimethyl carbonate, diethyl carbonate, diphenyl carbonate or the like, or a halogenated carbonyl compound such as phosgene or the like) to give rise to polymerization; and it is a known polymer described in, for example, U.S. Pat. No. 3,466,260.

That the polycarbonate of bisphenol M according to the present invention has excellent dyeability, is neither described in any of known patents (including U.S. Pat. No. 3,466,260), literatures and the like, nor known. The dyeability of the polycarbonate of bisphenol M has been found out for the first time as a result of investigations by the present inventors, and is quite surprising as compared with the conventional knowledge that polycarbonates have very inferior dyeability.

As the process for producing such a polycarbonate, there are mentioned, for example, a process described in the above-mentioned U.S. Pat. No. 3,466,260 and various known polymerization processes for polycarbonate production [for example, solution polymerization process, ester exchange process, or interfacial polymerization process described in Jikken Kagaku Koza, Fourth Edition (28), Polymer Synthesis, pp. 231–242, Maruzen Publication (1988)].

The polycarbonate used in the present invention is a polycarbonate having polycarbonate units as essential units, derived from the bisphenol M represented by the formula (1-a), or a copolycarbonate derived from the bisphenol M and other bisphenol. In the present specification, they are referred to as (co)polycarbonate. The polycarbonate used in the present invention may also be a blend of the (co) polycarbonate and an other known polycarbonate or copolycarbonate.

The molecular weight of the (co)polycarbonate according to the present invention is not critical and is ordinarily 10,000 to 300,000, preferably 20,000 to 250,000, more preferably 30,000 to 200,000 in terms of standard polystyrene-reduced weight-average molecular weight as measured by GPC (gel permeation chromatography).

The polydispersity index of the (co)polycarbonate, expressed as a ratio of weight-average molecular weight and number-average molecular weight is not critical and is preferably 1.5 to 20.0, more preferably 2.0 to 15.0.

In the polycarbonate according to the present invention, the terminal group may be reactive terminal group such as hydroxyl group, haloformate group, carbonic acid ester group or the like, or may be inactive terminal group blocked with a molecular weight modifier such as mentioned later. The terminal group is preferably inactive terminal group blocked with a molecular weight modifier.

In the (co)polycarbonate according to the present invention, the amount of the terminal group is not critical but is ordinarily 0.001 to 5 mole %, preferably 0.01 to 5 mole %, more preferably 0.1 to 3 mole % relative to the total moles of the structural units.

In producing the (co)polycarbonate of the present invention by the above-mentioned process, it is preferred to conduct polymerization in the presence of a molecular weight modifier for control of molecular weight. The molecular weight modifier is not critical as to the kind and can be a known molecular weight modifier used in polycarbonate production. There can be mentioned, for example, monovalent hydroxy aliphatic or aromatic compounds, their derivatives (e.g. alkali metal or alkaline earth metal salts of monovalent hydroxy aliphatic or aromatic compounds, haloformate compounds of monovalent hydroxy aliphatic or aromatic compounds, and carbonic acid esters of monovalent hydroxy aliphatic or aromatic compounds), monovalent carboxylic acids, and their derivatives (e.g. alkali metal or alkaline earth metal salts of monovalent carboxylic acids, .acid halides of monovalent carboxylic acids, and esters of monovalent carboxylic acids).

The amount of the molecular weight modifier used is not critical and can be such as required for control to an intended molecular weight. The amount is ordinarily 0.001 to 5 mole %, preferably 0.01 to 5 mole % relative to the total moles of the dihydroxy compound polymerized.

The polycarbonate according to the present invention is a polycarbonate having, as essential components, repeating structural units represented by the formula (1-a), and may have repeating structural units other than the repeating structural units represented by the formula (1-a). In the latter case, the proportion of the repeating structural units represented by the formula (1-a), in the total repeating structural units is ordinarily 50 mole % or more, preferably 70 mole %, more preferably 80 mole % or more, further preferably 90 mole % or more. Also when the polycarbonate has such other structural units, the other structural units may be one kind, or two or more kinds.

In order to obtain the intended effects of the present invention, there is particularly preferred a polycarbonate having only repeating structural units represented by the formula (1-a) and not having any other repeating structural units.

In these cases, the structural units of polymer chain terminal group include structural units derived from the above-mentioned molecular weight modifier.

The repeating structural units other than those represented by the formula (1-a), usable in the present invention are repeating structural units derived from dihydroxy compounds other than the bisphenol M represented by the formula (1). Such dihydroxy compounds can be exemplified by various known aromatic or aliphatic dihydroxy compounds.

Specific examples of the aromatic dihydroxy compounds include:

bis(hydroxyaryl)alkanes such as bis(4-hydroxyphenyl) methane, 1,1-bis(4'-hydroxyphenyl)ethane, 1,2-bis(4'-hydroxyphenyl)ethane, bis(4-hydroxyphenyl) phenylmethane, bis((4-hydroxyphenyl) diphenylmethane, bis(4-hydroxyphenyl)-1-naphthylmethane, 1,1-bis(4'-hydroxyphenyl)-1-phenylethane, 2,2-bis(4'-hydroxyphenyl)propane (so-called bisphenol A), 2-(4'-hydroxyphenyl)-2-(3'-hydroxyphenyl)propane, 2,2-bis(4'-hydroxyphenyl) butane, 1,1-bis(4'-hydroxyphenyl)butane, 2,2-bis(4'-hydroxyphenyl)-3-methylbutane, 2,2-bis(4'-hydroxyphenyl)pentane, 3,3-bis(4'-hydroxyphenyl) pentane, 2,2-bis(4'-hydroxyphenyl)hexane, 2,2-bis(4'-hydroxyphenyl)octane, 2,2-bis(4'-hydroxyphenyl)-4-methylpentane, 2,2-bis(4'-hydroxyphenyl)heptane, 4,4-bis(4'-hydroxyphenyl)heptane, 2,2-bis(4'-hydroxyphenyl)tridecane, 2,2-bis(4'-hydroxyphenyl) octane, 2,2-bis(3'-methyl-4'-hydroxyphenyl)propane, 2,2-bis(3'-ethyl-4'-hydroxyphenyl)propane, 2,2-bis(3'-n-propyl-4'-hydroxyphenyl)propane, 2,2-bis(3'-isopropyl-4'-hydroxyphenyl)propane, 2,2-bis(3'-sec-butyl-4'-hydroxyphenyl)propane, 2,2-bis(3'-tert-butyl-4'-hydroxyphenyl)propane, 2,2-bis(3'-cyclohexyl-4'-hydroxyphenyl)propane, 2,2-bis(3'-allyl-4'-hydroxyphenyl)propane, 2,2-bis(3'-methoxy-4'-hydroxyphenyl)propane, 2,2-bis(3',5'-dimethyl-4'-hydroxyphenyl)propane, 2,2-bis(2',3',5',6'-tetramethyl-4'-hydroxyphenyl)propane, bis(4-hydroxyphenyl) cyanomethane, 1-cyano-3,3-bis(4'-hydroxyphenyl) butane, 2,2-bis(4'-hydroxyphenyl)hexafluoropropane and the like;

bis(hydroxyaryl)cycloalkanes such as 1,1-bis(4'-hydroxyphenyl)cyclopentane, 1,1-bis (4'-hydroxyphenyl)cyclohexane, 1,1-bis(4'-hydroxyphenyl)cycloheptane, 1,1-bis(3'-methyl-4'-hydroxyphenyl)cyclohexane, 1,1-bis(3',5'-dimethyl-4'-hydroxyphenyl)cyclohexane, 1,1-bis(3',5'-dichloro-4'-hydroxyphenyl)cyclohexane, 1,1-bis(3'-methyl-4'-hydroxyphenyl)-4-methylcyclohexane, 1,1-bis(4'-hydroxyphenyl)-3,3,5-trimethylcyclohexane, 2,2-bis (4'-hydroxyphenyl)norbornane, 2,2-bis(4'-hydroxyphenyl)adamantane and the like;

bis(hydroxyaryl) ethers such as 4,4'-dihydroxydiphenyl ether, 4,4'-dihydroxy-3,3'-diamethyldiphenyl ether, ethylene glycol bis(4-hydroxyphenyl) ether and the like;

bis(hydroxyaryl) sulfides such as 4,4'-dihydroxydiphenyl sulfide, 3,3'-dimethyl-4,4'-dihydroxydiphenyl sulfide, 3,3'-dicyclohexyl-4,4'-dihydroxydiphenyl sulfide, 3,3'-diphenyl-4,4'-dihydroxydiphenyl sulfide and the like;

bis(hydroxyaryl) sulfoxides such as 4,4'-dihydroxydiphenyl sulfoxide, 3,3'-dimethyl-4,4'-dihydroxydiphenyl sulfoxide and the like;

bis(hydroxyaryl)sulfones such as 4,4 dihydroxydiphenylsulfone, 4,4 dihydroxy-3,3 dimethyldiphenylsulfone and the like;

and other dihydroxy compounds such as α,α'-bis(4-hydroxyphenyl)-1,4-diisopropylbenzene (bisphenol P), 6,6'-dihydroxy-3,3,3',3'-tetramethyl-1,1'-spirobiindane, 7,7'-dihydroxy-3,3',4,4'-tetrahydro-4,4,4',4'-tetramethyl-2,2'-spirobi(2H-1-benzopyran), trans-2,3-bis(4'-hydroxyphenyl)-2-butene, 9,9-bis(4'-hydroxyphenyl)fluorene, 3,3-bis(4'-hydroxyphenyl)2-butanone, 1,6-bis(4'-hydroxyphenyl)-1,6-hexanedione, 4,4'-dihydroxybiphenyl, hydroquinone, resorcin and the like.

Also included are aromatic dihydroxy compounds having ester linkage, which can be produced, for example, by reacting 2 moles of bisphenol A with 1 mole of isophthaloyl chloride or terephthaloyl chloride.

Specific examples of the aliphatic dihydroxy compounds include:

dihydroxyalkanes such as 1,2-dihydroxyethane, 1,3-dihydroxypropane, 1,4-dihydroxybutane, 1,5-dihydroxypentane, 1,6-dihydroxyhexane, 1,7-dihydroxyheptane, 1,8-dihydroxyoctane, 1,9-dihydroxynonane, 1,10-dihydroxydecane, 1,11-dihydroxyundecane, 1,12-dihydroxydodecane, dihydroxyneopentyl, 2-ethyl-1,2-dihydroxyhexane, 2-methyl-1,3-dihydroxypropane and the like; and dihydroxycycloalkanes such as 1,3-dihydroxycyclohexane, 1,4-dihydroxycyclohexane, 2,2-bis(4'-hydroxycyclohexyl)propane and the like.

Also included are dihydroxy compounds such as o-dihydroxyxylylene, m-dihydroxyxylylene, p-dihydroxyxylylene, 1,4-bis(2'-hydroxyethyl)benzene, 1,4-bis(3'-hydroxypropyl)benzene, 1,4-bis(4'-hydroxybutyl)benzene, 1,4-bis(5'-hydroxypentyl)benzene, 1,4-bis(6'-hydroxyhexyl)benzene, 2,2-bis[4'-(2"-hydroxyethyloxy)phenyl]propane, 2,2-bis[4'-(2"-hydroxypropyloxy)phenyl]propane, 6,6'-bis(2"-hydroxyethyloxy)-3,3,3',3'-tetramethyl-1,1'-spirobiindane, 6,6'-bis(2"-hydroxypropyloxy)-3,3,3',3'-tetramethyl-1,1' spirobiindane and the like.

To the polycarbonate according to the present invention may be added, during the production or its molding, various additives such as antioxidant (e.g. hindered phenol, phosphorous acid ester or phosphoric acid ester), heat stabilizer (e.g. phenol type, hindered phenol type, sulfur type, metal phosphate or metal phosphite), ultraviolet absorber, lubricant, organic halogen compound type flame retardant, releasing agent, flowability improver, antistatic agent and the like, as long as the addition does not impair the intended effects of the present invention.

The polycarbonate according to the present invention may be compounded with other polycarbonate, for example, an aromatic polycarbonate derived from 2,2-bis(4'-hydroxyphenyl)propane, as long as the intended effects of the present invention are not impaired thereby, whereby the resultant compound can be used as a molding material. In that case, the proportion of repeating structural units represented by the formula (1-a) is ordinarily 70 mole %, preferably 80 mole % or more, more preferably 90 mole % or more.

As the other polymer, there can be mentioned polyethylene, polypropylene, polystyrene, ABS resin, polymethyl methacrylate, polytrifluoroethylene, polytetrafluoroethylene, polyacetal, polyphenylene oxide, polybutylene terephthalate, polyacetylene terephthalate, polyamide, polyimide, polyamideimide, polyetherimide, polysulfone, polyethersulfone, paraoxybenzoyl type polyester, polyarylate, polysulfide, etc.

The dyed molded article according to the present invention can be preferably produced by steps including (1) a step of producing a molded article from the above-mentioned polycarbonate by a known molding method to be described later and (2) a step of dyeing the molded article by a known dyeing method.

As the molded article according to the present invention, there can be mentioned various molded articles for which transparency and dyeability are required. Representative examples of such molded articles are optical lenses used in eyeglasses, sunglasses, etc.; transparent materials as a glass substitute used in vehicles (e.g. automobiles), structures, etc.; and transparent structural materials used in electrical or electronic appliances, etc. The molded article of the present invention is not restricted thereto. Particularly preferable examples of the present molded article to be dyed are optical lenses used in eyeglasses, sunglasses, etc., because these lenses require dyeability strongly for fashionability.

The polycarbonate according to the present invention is thermoplastic and can be subjected to injection molding, extrusion molding and blow molding in a molten state; and is moldable also by other known methods such as compression molding, solution casting and the like. The molded article according to the present invention can preferably be produced by these molding methods.

The dyed molded article of the present invention can preferably be produced by dyeing the molded article produced by the above molding method, by one of various known dyeing methods. As a representative dyeing method, there can be mentioned, for example, a method of conducting dyeing with a dye (e.g. a disperse dye), a pigment or the like in an aqueous medium, an organic solvent, or their mixture.

Of the above dyeing methods, a method of conducting dyeing in an organic solvent (e.g. a method described in JP-A-8-104759 or the like) has an advantage in that a molded article can be dyed at a high density with relative easiness; however, with the method, the organic solvent used may erode the surface of a molded article and impair the transparency of the molded article depending upon the dyeing conditions employed (e.g. the kind of the solvent used, the temperature and time of dyeing used, etc.). Therefore, of the above methods, a method of conducting dyeing with a disperse dye in an aqueous medium is preferred.

When dyeing is conducted in an organic solvent, the organic solvent used is not critical as to the kind and can be one of various known organic solvents ordinarily used. In view of the above-mentioned problem, however, a water-soluble alcohol type solvent or its mixture with water is preferred to a water-insoluble organic solvent (particularly, a halogenated hydrocarbon type solvent or the like).

The dye and pigment are not critical as to the kinds, and various known dyes and pigments used in dyeing of fiber, resin, etc. can be used preferably.

As the method for conducting dyeing with a disperse dye in an aqueous medium, there is, for example, a method which comprises dispersing a disperse dye in an aqueous medium, adding, as necessary, known additives (e.g. a surfactant, a pH-controlling agent, a dispersing aid leveling agent and a dyeing accelerator) to prepare a dyeing bath of given temperature, and immersing therein a lens molded by the above-mentioned method, for a given length of time.

As the dye used in production of the dyed molded article of the present invention, a disperse dye is preferred as mentioned previously. The disperse dye is exemplified by azo type dyes, quinophthalone type dyes and anthraquinone type dyes.

The amount of the disperse dye used is not critical but is ordinarily 0.5 to 30 g/liter in terms of concentration in dyeing bath.

The disperse dye used is not particularly restricted as to the kind and various known disperse dyes can be used satisfactorily. Specific examples of such disperse dyes include the following products of Mitsui BASF Dye K.K.

As azo dyes, there can be mentioned, for example, Miketon Polyester (hereinafter referred to as M/P) Yellow 5G, M/P Yellow 5GF, M/P Yellow 5R, M/P Yellow GL, M/P Orange 3GSF, M/P Orange SF, M/P Orange SC, M/P Orange B, M/P Yellow Brown R, M/P Brown 2RL, M/P Scarlet RR, M/P Scarlet 3R, M/P Scarlet 3RG, M/P Scarlet RCS, M/P Scarlet BRSF, M/P Red FL, M/P Red 3BSF, M/P Ruibine GCSF, M/P Ruibine GL, M/P Violet ADW, M/P Discharge Blue R, M/P Blue G-ADW, M/P Blue 3RT, M/P Blue 3RSF, M/P Blue 2RF, M/P Blue 7GSF, M/P Red Brown S, M/P Navy Blue 3GS, M/P Navy Blue GLSF, M/P Navy Blue BGSF, M/P Navy Blue TNSF, M/P Navy Blue RRSF and M/P Navy Blue TRSF.

As quinophthalone type dyes, there can be mentioned M/P Yellow 3GSL, M/P Yellow F3G, M/P Yellow GSL, etc.

As anthraquinone type dyes, there can be mentioned M/P Yellow HLS, M/P Red FB, M/P Red 4BF, M/P Red SL, M/P Red T4B, M/P Red BLSF, M/P Red Violet 4RL, M/P Red Violet FR, M/P Red Pink REL, M/P Blue FBL, M/P Blue FTK, M/P Blue VSL, M/P Blue TGSF, M/P Blue TSF, M/P Brill Blue 5B, M/P Brill Blue BG, etc.

As other dyes, there can be mentioned M/P Yellow YL, M/P Brill Red FGG, M/P Brown G, M/P Brown GF, MLP Gold Yellow-2, MLP Red-2, MLP Blue-2, etc.

In conducting dyeing with a disperse dye in an aqueous medium in a dyeing bath, a surfactant is added as necessary. The surfactant is not critical as to the kind and is exemplified by anionic surfactants such as salt of alkylbenzenesulfonic acid, salt of alkylsulfosuccinic acid, salt of lauryl sulfate, and the like, and nonionic surfactants such as polyethylene glycol alkyl ether, polyethylene glycol sorbitan fatty acid ester, and the like. These surfactants may be used singly or in admixture of two or more kinds.

The amount of the surfactant used is not critical but is ordinarily 0.1 to 500 g/liter in terms of concentration in dyeing bath.

The dyeing temperature is not critical but is ordinarily 50 to 110° C., preferably 80 to 95° C.

The dyeing time varies depending upon the conditions such as dyeing temperature and the like, but is ordinarily about 1 minute to 1 hour.

The dyed molded article of the present invention is as necessary dyed into a desired color and must be satisfactorily dyed by a dye or pigment of desired color (e.g. red, blue or yellow). The polycarbonate having a bisphenol M structure as repeating units, used in the present invention shows excellent dyeability for such a dye or pigment; therefore, by appropriately setting the above-mentioned dyeing conditions (e.g. the kind of dye or pigment, the kind of medium in dyeing bath, and the temperature and time of dyeing), it is possible to achieve desired dyeing, for example, dyeing in a desired color and density, or gradient dyeing wherein the color density of dyed molded article has a gradient.

In the dyed molded article of the present invention, the ratio of its spectral transmittance relative to the spectral transmittance of undyed molded article is preferably 0.1 to 0.9 at one or more wavelengths selected from 430 nm, 510 nm and 595 nm (hereinafter the ratio is referred to as spectral transmittance ratio). The spectral transmittance ratio of the dyed molded article of the present invention is more preferably 0.15 to 0.85, further preferably 0.15 to 0.75, particularly preferably 0.2 to 0.7.

The molded article of the present invention is used particularly preferably as an optical lens. In this optical lens, the portion of the dyed molded article having a thickness of 1.5±0.5 mm shows a spectral transmittance of 5 to 85%, preferably 10 to 80%, more preferably 15 to 70%, most preferably 20 to 70%, at one or more wavelengths selected from 430 nm, 510 nm and 595 nm.

EXAMPLES

The present invention is described in more detail below by way of Examples. However, the present invention is in no way restricted to the Examples.

The polycarbonates produced in the following Production Examples and Comparative Production Examples were measured for properties according to the following methods.

[Measurement of Molecular Weight]

A chloroform solution containing 0.2% by weight of a polycarbonate was subjected to GPC (gel permeation chromatography) using System-11 produced by Showa Denko K. K., to measure the weight-average molecular weight (Mw) of the polycarbonate. Incidentally, the molecular weight is a standard polystyrene-reduced value.

[Measurement of Spectral Transmittance]

A molded article (a lens) produced and dyed in one of the following Examples and Comparative Examples was measured for spectral transmittances at various wavelengths using a spectrophotometer (CARY-5 produced by Nihon Varian Sha).

Spectral transmittance ratio was expressed as a ratio of the spectra transmittance (measured as above) of dyed molded article to the spectral transmittance (measured as above) of undyed molded article.

Production Example 1 (Production of Bisphenol M Polycarbonate)

A flask with baffle, having an internal volume of 2 liters was provided with a stirrer with lattice-shaped blade, a reflux condenser and a dipping tube for introduction of phosgene. Into the flask were fed 173 g (0.50 mole) of $\alpha,\alpha'$-bis(4-hydroxyphenyl)-1,3-diisopropylbenzene (bisphenol M, BPM), 56 g (1.40 moles) of sodium hydroxide, 0.423 g (0.0045 mole) of phenol and 600 ml of deionized water, to prepare an aqueous solution. To the aqueous solution was added 600 ml of dichloromethane (thereby a two-phase mixture was formed). To the two-phase mixture was fed, with stirring, 59.4 g (0.60 mole) of carbonyl chloride at a rate of 9.9 g/min. After the completion of carbonyl chloride feeding, 0.08 g of triethylamine was added to the reaction mixture, after which stirring was continued for 90 minutes. The stirring was stopped; the reaction mixture was subjected to phase separation; the dichloromethane phase was neutralized with an aqueous hydrochloric acid solution, and washed with deionized water until substantially no electrolyte was detected in the aqueous washings obtained. The resultant dichloromethane phase was subjected to distillation to remove dichloromethane, whereby was obtained 170 g of a colorless solid polycarbonate having repeating structural units represented by the formula (1-a) and a weight-average molecular weight of 150,000. The polycarbonate was subjected to differential thermal analysis in a temperature range of 0 to 300° C. using a scanning calorimeter (DSC-3100 produced by Mac Science Co., Ltd.). As a result, the polycarbonate had a glass transition temperature (Tg) of 102° C. The polycarbonate was measured for $^1$H-NMR in a deuterated chloroform solution containing 1% by weight of the polycarbonate, and also for IR spectrum. The results are shown below.

$^1$H-NMR δ (CDCl$_3$):
1.4 (s,12H), 6.3–7.2 (m,12H);
IR (KBr method):
1,780 cm$^{-1}$ [—O—C(=O)—O—].
Other properties are shown below.
Specific gravity: 1.15
Refractive index (n$_d$): 1.59
Abbe's number: 30

Production Example 2

The operation of Production Example 1 was repeated except that 173 g (0.50 mole) of α,α'-bis(4-hydroxyphenyl)-1,3-diisopropylbenzene (bisphenol M, BPM) was replaced by 138 g (0.40 mole) of α,α'-bis(4-hydroxyphenyl)-1,3-diisopropylbenzene (bisphenol M, BPM) and 22.8 g (0.10 mole) of 2,2-bis(4'-hydroxyphenyl)propane, whereby was obtained a copolycarbonate (a random copolymer) having structural units represented by the following formulas (1-a) and (2-a).

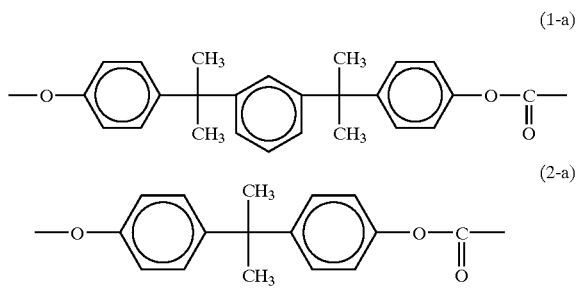

The copolycarbonate had a weight-average molecular weight of 125,000. The copolycarbonate was subjected to differential thermal analysis in a temperature range of 0 to 300° C. using a scanning calorimeter (DSC-3100 produced by Mac Science Sha). As a result, the copolycarbonate had a glass transition temperature (Tg) of 1200° C.

The copolycarbonate was measured for $^1$H-NMR in a deuterated chloroform solution containing 1% by weight of the copolycarbonate. As a result, it was confirmed from the integral ratio of isopropylidene group that the molar ratio of the repeating structural units represented by the formula (1-a) and the repeating structural units represented by the formula (2-a) is 80:20. The copolycarbonate was measured for IR spectrum, and the result is shown below.

IR (KBr method):
1,750 cm$^{-1}$, 1,780 cm$^{-1}$ [—O—C(=O)—O—].

Comparative Production Example 1

A polycarbonate of bisphenol A was produced in the same manner as in Production Example 1 except that bisphenol M was replaced by bisphenol A (BPA). The polycarbonate had a weight-average molecular weight of 30,000.

Comparative Production Example 2

A polycarbonate of bisphenol P was produced in the same manner as in Production Example 1 except that bisphenol M was replaced by α,α'-bis(4-hydroxyphenyl)-1,4-diisopropylbenzene (bisphenol P). The polycarbonate had a weight-average molecular weight of 80,000.

[Production of Dyeing Baths]

5 g of MLP Gold Yellow-2 (a disperse dye produced by Mitsui BASF Dye K.K.) was added to 1,000 ml of pure water. The resultant mixture was heated to 85° C. and maintained at that temperature to obtain a yellow dyeing solution. Separately, a red dyeing solution and a blue dyeing solution were produced in the same manner as mentioned above except that MLP Gold Yellow-2 was replaced by MLP Red-2 or MLP Blue-2 (both are products of Mitsui BASF Dye K. K.).

Example 1 (Production of Red-dyed Lens)

100 parts by weight of the polycarbonate of bisphenol M produced in Production Example 1 and 0.2 part by weight of tris(2,4-di-tert-butylphenyl) phosphite were mixed using a Henschel mixer. The resultant mixture was melt-kneaded using a single-screw extruder (65 mm) to obtain pellets of the polycarbonate. The pellets were subjected to injection molding by a 30-ton injection molding machine at a molding temperature of 260° C. at a die temperature of 50° C., to obtain a colorless, transparent, plus lens (convex lens)-shaped molded article having a central thickness of 1.5 mm. The molded article was measured for spectral transmittances at 430 nm, 510 nm and 595 nm. The spectral transmittances were all 90%.

The molded article was immersed in a red dyeing solution produced by the above method, at 80° C. for 10 minutes to obtain a red-dyed molded article. This molded article was measured for spectral transmittance at 510 nm at the central thickness of 1.5 mm, by the above method. The spectral transmittance was 48% and resultantly the spectral transmittance ratio of the molded article was 0.533. The dyeability of the molded article was very good when rated visually, there was no color unevenness, the molded article was a satisfactorily dyed molded article. The lens-shaped molded article was practically satisfactory in impact resistance, heat resistance, etc.

Example 2 (Production of Blue-dyed Molded Article)

A blue-dyed, lens-shaped molded article was obtained in the same manner as in Example 1 except that the red dyeing solution was replaced by a blue dyeing solution.

This molded article was measured for spectral transmittance at 595 nm at the central thickness of 1.5 mm, by the above method. The spectral transmittance was 50% and resultantly the spectral transmittance ratio of the molded article was 0.556. The dyeability of the molded article was very good, there was no color unevenness, the molded article was a satisfactorily dyed molded article. The lens-shaped molded article was practically satisfactory in impact resistance, heat resistance, etc.

Example 3 (Production of Yellow-dyed Molded Article)

A yellow-dyed, lens-shaped molded article was obtained in the same manner as in Example 1 except that the red dyeing solution was replaced by a yellow dyeing solution.

This molded article was measured for spectral transmittance at 430 nm at the central thickness of 1.5 mm, by the above method. The spectral transmittance was 50% and resultantly the spectral transmittance ratio of the molded article was 0.556. The dyeability of the molded article was very good, there was no color unevenness, the molded article was a satisfactorily dyed molded article. The lens-shaped molded article was practically satisfactory in impact resistance, heat resistance, etc.

Example 4 (Production of Red-dyed Lens)

100 parts by weight of the copolycarbonate produced in Production Example 2 and 0.1 part by weight of tris(2,4-di-tert-butylphenyl) phosphite were mixed using a Henschel mixer. The resultant mixture was melt-kneaded using a single-screw extruder (65 mm) to obtain pellets of the copolycarbonate. The pellets were subjected to injection molding by a 30-ton direct pressure type molding machine at a molding temperature of 270° C. at a die temperature of 70° C., to obtain a colorless, transparent, minus lens (concave lens)-shaped molded article having a central thickness of 1.5 mm. The molded article was measured for spectral transmittances at 430 nm, 510 nm and 595 nm. The spectral transmittances were all 90%.

The molded article was immersed in a red dyeing solution produced by the above method, at 75° C. for 15 minutes to obtain a red-dyed molded article.

This molded article was measured for spectral transmittance at 510 nm at the central thickness of 1.5 mm, by the above method. The spectral transmittance was 45% and resultantly the spectral transmittance ratio of the molded article was 0.556. The dyeability of the molded article was very good when rated visually, there was no color unevenness, the molded article was a satisfactorily dyed molded article. The lens-shaped molded article was practically satisfactory in impact resistance, heat resistance, etc.

Example 5 (Production of Blue-dyed Molded Article)

A blue-dyed, lens-shaped molded article was obtained in the same manner as in Example 4 except that the red dyeing solution was replaced by a blue dyeing solution.

This molded article was measured for spectral transmittance at 595 nm at the central thickness of 1.5 mm, by the above method. The spectral transmittance was 46% and resultantly the spectral transmittance ratio of the molded article was 0.511. The dyeability of the molded article was very good when rated visually, there was no color unevenness, the molded article was a satisfactorily dyed molded article. The lens-shaped molded article was practically satisfactory in impact resistance, heat resistance, etc.

Example 6 (Production of Yellow-dyed Molded Article)

A yellow-dyed, lens-shaped molded article was obtained in the same manner as in Example 4 except that the red dyeing solution was replaced by a yellow dyeing solution.

This molded article was measured for spectral transmittance at 430 nm at the central thickness of 1.5 mm, by the above method. The spectral transmittance was 45% and resultantly the spectral transmittance ratio of the molded article was 0.5. The dyeability of the molded article was very good when rated visually, there was no color unevenness, the molded article was a satisfactorily dyed molded article. The lens-shaped molded article was practically satisfactory in impact resistance, heat resistance, etc.

Comparative Example 1

Lens-shaped molded articles were produced and dyed in the same manners as in Examples 1 to 3 except that the polycarbonate of BPM produced in Production Example 1 was replaced by the polycarbonate of bisphenol A produced in Comparative Production Example 1. All of the molded articles showed a transmittance of 90% and a spectral transmittance ratio of 1.0, at each of 430 nm, 510 nm and 595 nm.

When observed visually, the molded articles were not substantially tinted in any of red, blue and yellow colors.

Comparative Example 2

Lens-shaped molded articles were produced and dyed in the same manners as in Examples 1 to 3 except that the polycarbonate of BPM produced in Production Example 1 was replaced by the polycarbonate of bisphenol P produced in Comparative Production Example 2. All of the molded articles showed a transmittance of 89% and a spectral transmittance ratio of 0.989, at each of 430 nm, 510 nm and 595 nm.

Comparative Example 3

A lens-shaped molded article was produced using the polycarbonate of bisphenol M produced in Production Example 1, by the method described in Example 1. The molded article was dyed according to the method described in Example 2 of JP-A-8-104759. There was no color unevenness and the dyeing was satisfactory, when rated visually; however, the molded article after dyeing was cloudy and had no transparency owing to the solvent compound (organic solvent) contained in the mixture used for dyeing.

INDUSTRIAL APPLICABILITY

A polycarbonate of bisphenol A and a polycarbonate of bisphenol P, which are each a general-purpose optical resin, are not substantially dyed by the dyeing method ordinarily used for lenses. Meanwhile, a polycarbonate having structural units of bisphenol M, used in the present invention, surprisingly shows very good dyeability. As a result, a dyed lens made of a polycarbonate has been provided for the first time by the present invention.

What is claimed is:

1. A dyed polycarbonate molded article having repeating structural units represented by the following formula (1-a):

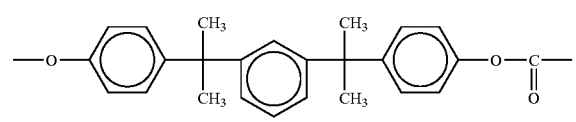

(1-a)

wherein the molded article is dyed with a disperse dye in an aqueous medium.

2. A dyed polycarbonate molded article having repeating structural units represented by the following formula (1-a):

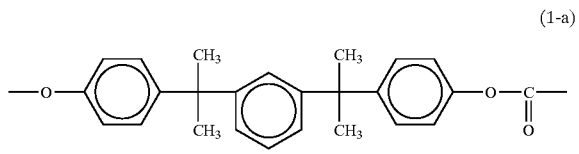

wherein the molded article is dyed with a disperse dye in an aqueous medium and has a spectral transmittance of 10 to 90% relative to the spectral transmittance of the molded article at one or more wavelengths selected from 430 nm, 510 nm and 595 nm.

3. A dyed molded article according to claim 2, wherein the molded article comprises a polycarbonate having a weight-average molecular weight of 10,000 to 300,000.

4. An optical lens made of a dyed molded article set forth in claim 3.

5. An optical lens according to claim 4, wherein the portion of the dyed molded article having a thickness of 1.5±0.5 mm shows a spectral transmittance of 5 to 85% at one or more wavelengths selected from 430 nm, 510 nm and 595 nm.

6. A dyed molded article according to claim 1, wherein the molded article comprises a polycarbonate having a weight-average molecular weight of 10,000 to 300,000.

7. An optical lens made of a dyed molded article set forth in claim 6.

8. An optical lens according to claim 7, wherein the portion of the dyed molded article having a thickness of 1.5±0.5 mm shows a spectral transmittance of 5 to 85% at one or more wavelengths selected from 430 nm, 510 nm and 595 nm.

9. An optical lens made of a dyed molded article set forth in claim 2.

10. An optical lens according to claim 9, wherein the portion of the dyed molded article having a thickness of 1.5±0.5 mm shows a spectral transmittance of 5 to 85% at one or more wavelengths selected from 430 nm, 510 nm and 595 nm.

11. An optical lens made of a dyed molded article set forth in claim 1.

12. An optical lens according to claim 11, wherein the portion of the dyed molded article having a thickness of 1.5±0.5 mm shows a spectral transmittance of 5 to 85% at one or more wavelengths selected from 430 nm, 510 nm and 595 nm.

* * * * *